US008613416B2

(12) United States Patent
White

(10) Patent No.: US 8,613,416 B2
(45) Date of Patent: Dec. 24, 2013

(54) CEILING MOUNTABLE HANGING APPARATUS

(76) Inventor: Brian Keith White, Bensalem, PA (US)

(*) Notice: Subject to any disclaimer, the term of this patent is extended or adjusted under 35 U.S.C. 154(b) by 193 days.

(21) Appl. No.: 12/984,580

(22) Filed: Jan. 4, 2011

(65) Prior Publication Data
US 2012/0168586 A1 Jul. 5, 2012

(51) Int. Cl.
B42F 13/00 (2006.01)
A47B 96/06 (2006.01)

(52) U.S. Cl.
USPC ........ 248/339; 248/308; 248/302; 248/217.2; 248/216.1; 248/217.3; 411/459; 411/487; 211/106.01; 43/36; 43/42.16

(58) Field of Classification Search
USPC ................ 248/339, 322, 216.1, 216.4, 217.1, 248/217.2, 217.3, 218.1, 218.3, 546, 290.1, 248/294.1, 308, 305, 306, 231.91, 303, 304, 248/690; 211/115, 116, 34, 54.1, 59.1, 31, 211/106.01, 125; 43/36, 42.16; 411/459, 411/487, 496
See application file for complete search history.

(56) References Cited

U.S. PATENT DOCUMENTS

| 253,942 | A | * | 2/1882 | Onderdonk | 248/308 |
| 289,213 | A | * | 11/1883 | Bracking | 7/123 |
| 336,960 | A | * | 3/1886 | Taylor | 248/218.3 |
| 426,778 | A | * | 4/1890 | Dalton | 248/322 |
| 459,300 | A | * | 9/1891 | Mosier | 248/217.2 |
| 470,279 | A | * | 3/1892 | Zuckweiler | 43/35 |
| 1,026,622 | A | * | 5/1912 | Blount | 248/692 |
| 1,132,414 | A | * | 3/1915 | White | 248/308 |
| 1,163,101 | A | * | 12/1915 | Megill | 211/96 |
| 2,257,403 | A | * | 9/1941 | Vandine | 43/44.6 |
| 2,513,548 | A | * | 7/1950 | Buss | 43/44.8 |
| 2,783,580 | A | * | 3/1957 | Balboni | 43/44.82 |
| 2,842,329 | A | * | 7/1958 | Friedman et al. | 248/308 |
| 3,205,607 | A | * | 9/1965 | Rossnan | 43/36 |
| 3,222,814 | A | * | 12/1965 | Rossnan | 43/36 |
| 3,359,625 | A | * | 12/1967 | Rossnan | 29/436 |
| 3,751,844 | A | * | 8/1973 | Rossnan | 43/36 |
| 3,820,195 | A | * | 6/1974 | Hutzell | 452/187 |
| 4,283,877 | A | * | 8/1981 | Onstott et al. | 43/34 |
| 4,403,437 | A | * | 9/1983 | Shuman | 43/36 |
| 5,265,370 | A | * | 11/1993 | Wold | 43/44.82 |
| 6,267,343 | B1 | * | 7/2001 | Waisbrod et al. | 248/339 |
| 2002/0124456 | A1 | * | 9/2002 | Mendoza | 43/44.82 |
| 2010/0154286 | A1 | * | 6/2010 | Lee | 43/44.82 |

* cited by examiner

Primary Examiner — Kimberly Wood
(74) Attorney, Agent, or Firm — Robert F. Gilbert

(57) ABSTRACT

Embodiments of the present disclosure include an apparatus employing two or more members arranged in a mounting configuration to pierce a ceiling and reconfigurable into a deployment configuration to suspend a load from the ceiling.

2 Claims, 5 Drawing Sheets

US 8,613,416 B2

CEILING MOUNTABLE HANGING APPARATUS

FIELD

Certain embodiments of the present disclosure generally relate to an apparatus for object suspension and, more particularly, a ceiling mountable hanging apparatus.

BACKGROUND

Maximizing the utilization of space in one's dwelling to store items has become a keen interest in the last few decades. Maximizing the utilization of one's space has expanded beyond footprint and square footage considerations to the use of walls and ceilings and considering the volume of one's dwelling. Conventional wall and ceiling based storage often includes mounted hooks requiring drilling tools and load bearing hardware or screw into place limiting load capacity.

SUMMARY

Certain embodiments provide a ceiling mountable hanging apparatus configurable into a first configuration and a second configuration. The apparatus generally includes a first rigid member comprising a shaft section joining a proximal end of a substantially perpendicular prong section with a proximal end of a hook section, a second rigid member comprising a shaft section joining a proximal end of a substantially perpendicular prong section with a proximal end of a hook section, and a yoking collar rotationally coupling the first rigid member to the second rigid member in a substantially parallel manner along the longitudinal axis of the shaft section of the first and the second rigid members.

Certain embodiments provide a ceiling mountable hanging apparatus configurable into a first configuration and a second configuration. The apparatus generally includes a first rigid member comprising a shaft section joining a proximal end of a substantially perpendicular prong section with a proximal end of a hook section, a second rigid member comprising a shaft section joining a proximal end of a substantially perpendicular prong section with a proximal end of a hook section, a third rigid member comprising a shaft section joining a proximal end of a substantially perpendicular prong section with a proximal end of a hook section, and a yoking collar rotationally coupling the first rigid member to the second rigid member and to the third rigid member in a substantially parallel manner along the longitudinal axis of the shaft section of the first, the second, and the third members.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
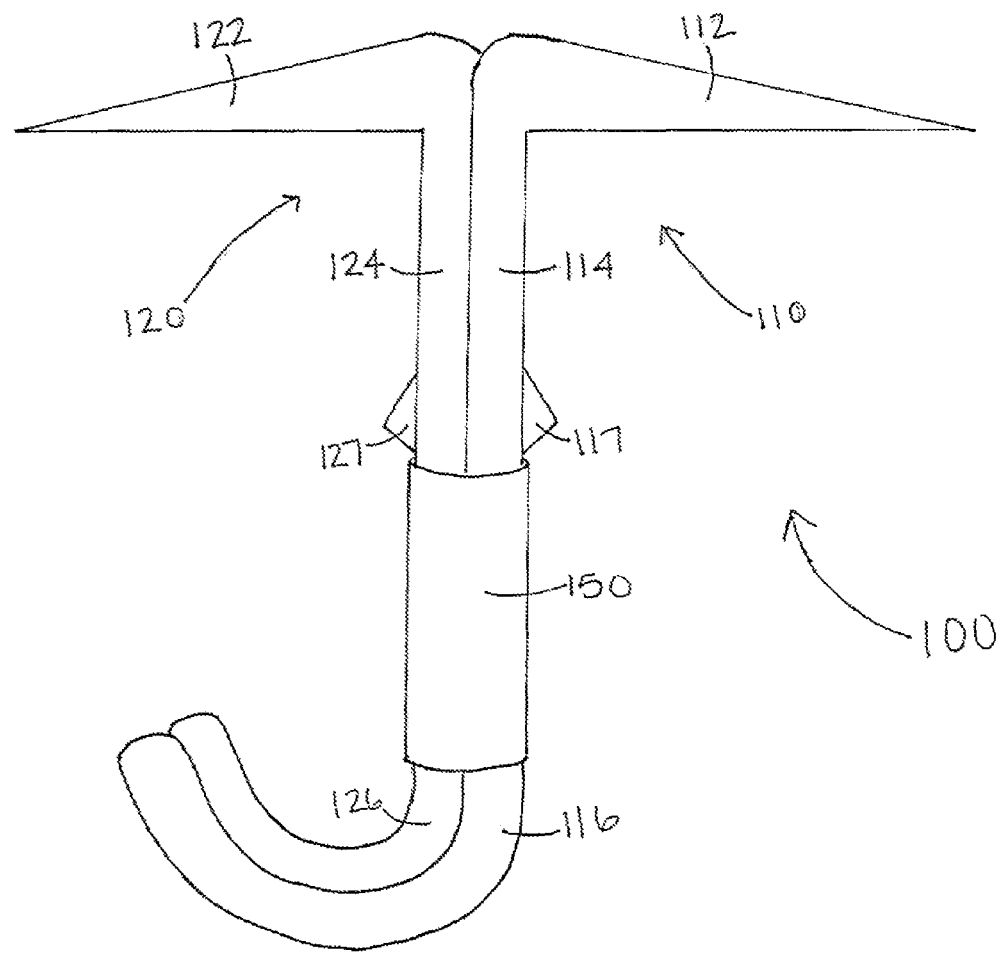
FIG. 1 is a diagram illustrating a side view of an exemplary two-pronged embodiment of the present disclosure in a deployed configuration.

Maximizing the utilization of one's space has expanded beyond footprint and square footage considerations. For example, storage for pots and pans has grown beyond cabinets and shelves to ceiling and wall mounted pot racks. Similarly, the stowage of bags and cables has evolved from shelves and bins to wall and ceiling mounted hooks. However, conventional wall and ceiling mounted hooks either require additional hardware and tools running a nontrivial risk of wall or ceiling damage or screw into place at the cost of a limited load capacity.

In contrast, embodiments of the present disclosure employ two or more members arranged in a mounting configuration to pierce a ceiling. The hole left by embodiments of the disclosure in piercing a ceiling is comparable to that left by screwing a hook into place, yet after being arranged in a deployment configuration their load capacity is comparable to hooks requiring bracket installation.

An Exemplary Ceiling Mountable Hanging Apparatus

In the following, reference is made to embodiments of the present disclosure. However, it should be understood that the present disclosure is not limited to specific described embodiments. Instead, any combination of the following features and elements, whether related to different embodiments or not, is contemplated to implement and practice the present disclosure. Furthermore, in various embodiments the disclosure provides numerous advantages over the prior art. However, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the present disclosure" shall not be construed as a generalization of any inventive subject matter disclosed herein and shall not be considered to be an element or limitation of the appended claims except where explicitly recited in a claim(s).

While embodiments of the disclosure may be susceptible to various modifications and alternative forms, specific embodiments thereof are shown by way of example in the drawings and will herein be described in detail. The drawings may not be to scale. It should be understood, however, that the drawings and detailed description thereto are not intended to limit embodiments to the particular form disclosed, but to the contrary, the intention is to cover all modifications, equivalents, and alternatives falling within the spirit and scope of the present disclosure as defined by the appended claims.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments of the disclosure.

It is to be understood that the forms of the disclosure shown and described herein are to be taken as examples of embodiments. Elements and materials may be substituted for those illustrated and described herein, parts and processes may be reversed, and certain features of the disclosure may be utilized independently, all as would be apparent to one skilled in the art after having the benefit of this disclosure. Changes may be made in the elements described herein without departing from the spirit and scope of the disclosure as described in the following claims.

FIG. 1 illustrates a side view of an exemplary two-pronged embodiment 100 in a deployed configuration. The exemplary two-pronged embodiment 100 includes a first member 110 and a second member 120. Members 110, 120 have three sections: prong sections 112, 122 at one end, hook sections 116, 126 at the opposite extreme, and shaft sections 114, 124 joining the hook sections 116, 126 to the prong sections 112, 122. In certain embodiments, the shaft sections 114, 124 and the prong sections 112, 122 may include protrusions or notches 118, 128.

Generally speaking, the first member 110 and second member 120 are loosely coupled to one another by means of a yoking collar 150. The yoking collar 150 is substantially cylindrical in shape with a hollow core. In many embodiments, the inner diameter of the yoking collar 150 may be sufficiently large to allow the shaft sections 114, 124 of the first and second members to rotate about one another along the longitudinal axis of the shafts within the hollow core.

Though the first and second members 110, 120 both have three sections, the orientation between the prong sections 112, 122 and the corresponding hook sections 116, 126 may differ between the first member 110 and the second member 120. For example, in some embodiments the prong section 112 of the first member 110 may face a direction opposite to the direction of and coplanar with the hook section 116, while the prong section 122 of the second member 120 may be coplanar with and face the same direction as that of the hook section 126. Consequently, when two-pronged embodiments of the present disclosure are in a deployed configuration, the prong sections 112, 122 of the first and second members 110, 120 may be coplanar yet opposite facing, while the hook sections 116, 126 of the first and second members 110, 120 may face in the same direction, as illustrated in FIG. 1.

In other embodiments the prong sections 112, 122 of the first and second members 110, 120 may not be coplanar with the corresponding hook sections 116, 126. For example, when in the deployed configuration, the prong section 112 of the first member 110 may be offset 45° to the left of the hook section 116, when looking down, while the prong section 122 of the second member 120 may be offset 45° to the right of the hook section 126, when looking down.

In embodiments of the present disclosure, the first and second members 110, 120 are made from a material fairly light, while being both rigid and strong. For example, in the simplest embodiments the first and second members 110, 120 may be made from a metal rod similar to that of a clothes hanger bent into three sections. In some instances this metal may be aluminum, steel, titanium, or other sufficiently light, rigid, and strong metal. In other embodiments, the first and second members 110, 120 may be made of a sufficiently rigid and strong polymer.

In embodiments of the present disclosure, the prong sections 112, 122 may be tapered from the proximal end towards the distal end. In some embodiments, the prong sections 112, 122 may taper to a point, allowing easy penetration into a ceiling or wall, while in other embodiments the prong sections 112, 122 may taper to a more rounded end to prevent unnecessary danger to users. In certain embodiments, the prong sections 112, 122 may be perpendicular in orientation to the corresponding shaft sections 114, 124. In other embodiments, the prong sections 112, 122 may form an acute angle with the shaft sections 114, 124.

In a preferred embodiment, the hook sections 116, 126 may be shaped as an arc or semicircle covering approximately 180°. In other embodiments, the hook sections 116, 126 may be angular in shape, like the bottom half of a rhombus, or shaped like the bottom half of a rectangle. In some embodiments, the hook sections 116, 126 may be tapered from the proximal end towards the distal end. As with the prong sections 112, 122, the hook sections 116, 126 of certain embodiments may taper to a point or may taper to a more rounded end preventing unnecessary danger to users or items stored thereon. Moreover, the hook sections 116, 126 may be covered in a rubber coating or other material with a relatively high coefficient of friction allowing items hung thereon to remain in place.

Figure 2:
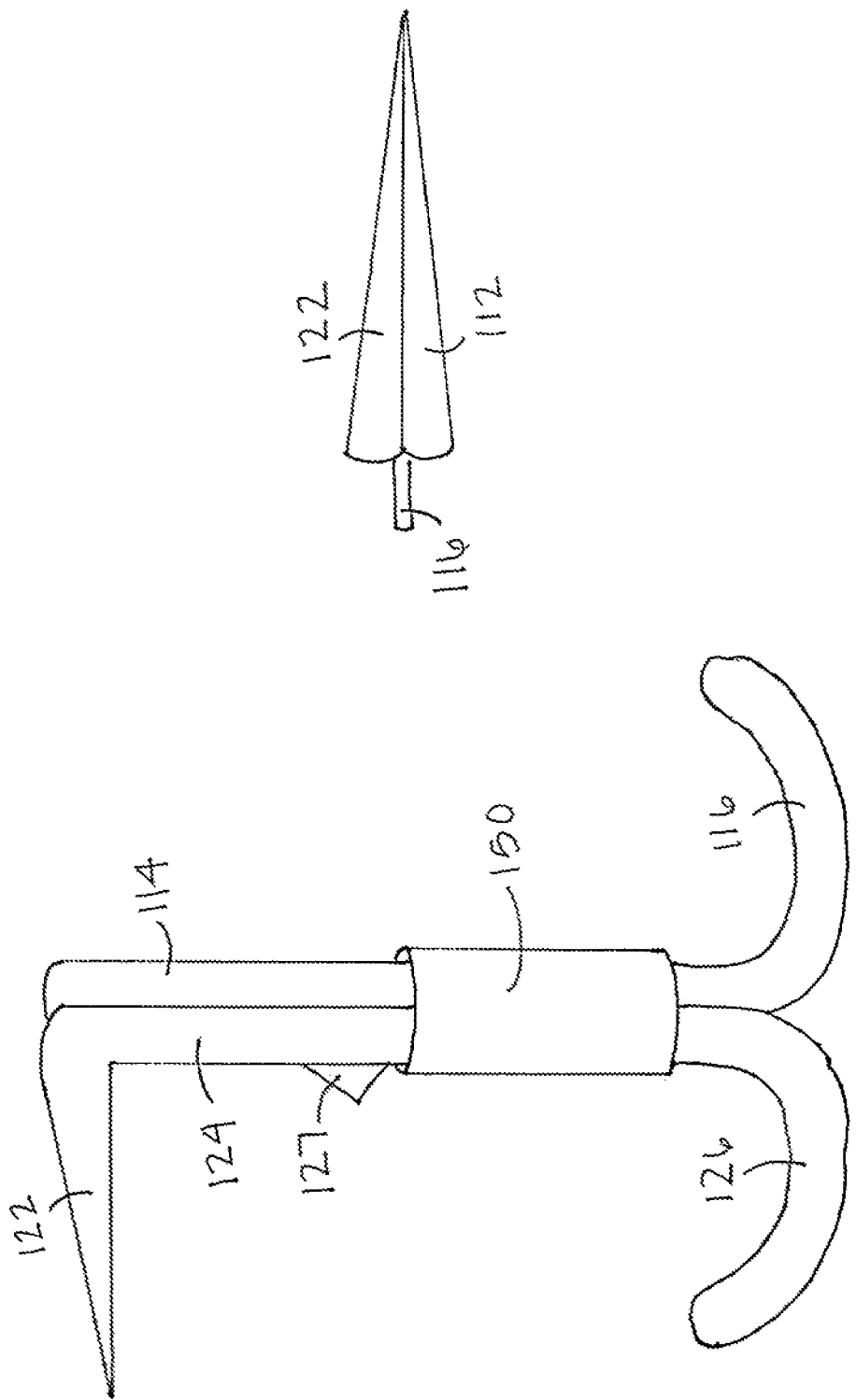
FIG. 2 is a diagram illustrating a side and a top view of an exemplary two-pronged embodiment of the present disclosure in a mounting configuration.

FIG. 2 illustrates a side view of an exemplary two-pronged embodiment 100 in a mounting configuration. In the mounting configuration, the prong sections of the first and second members 110, 120 may face in the same direction as one another. With both prongs substantially parallel to one another, additional strength may be provided enabling the prong sections 112, 122 to more easily pierce a ceiling or wall during installation. Note that in the deployed configuration of a preferred embodiment the hook sections 116, 126 of the first and second members 110, 120 may be substantially parallel and face the same direction and the prong sections 112, 122 may be opposite facing and coplanar. In contrast, in the mounting configuration the hook sections 116, 126 of the first and second members 110, 120 may be opposite facing and coplanar and the prong sections 112, 122 may be substantially parallel and face the same direction.

As previously suggested, users may rearrange embodiments of the present disclosure between a deployed configuration and a mounting configuration by rotating the first and second members 110, 120 about one another along the longitudinal axis of the shaft sections 114, 124.

FIG. 2 also illustrates a top view of the exemplary two-pronged embodiment 100 in a mounting configuration. The prong sections 112, 122 of the first and second members 110, 120 are substantially parallel and face the same direction. Moreover the hook section 116 of the first member 110 is visible on the opposite side of the prong sections 112, 122, while the hook section 126 of the second member 120 is hidden under the prong sections 112, 122.

Figure 3:
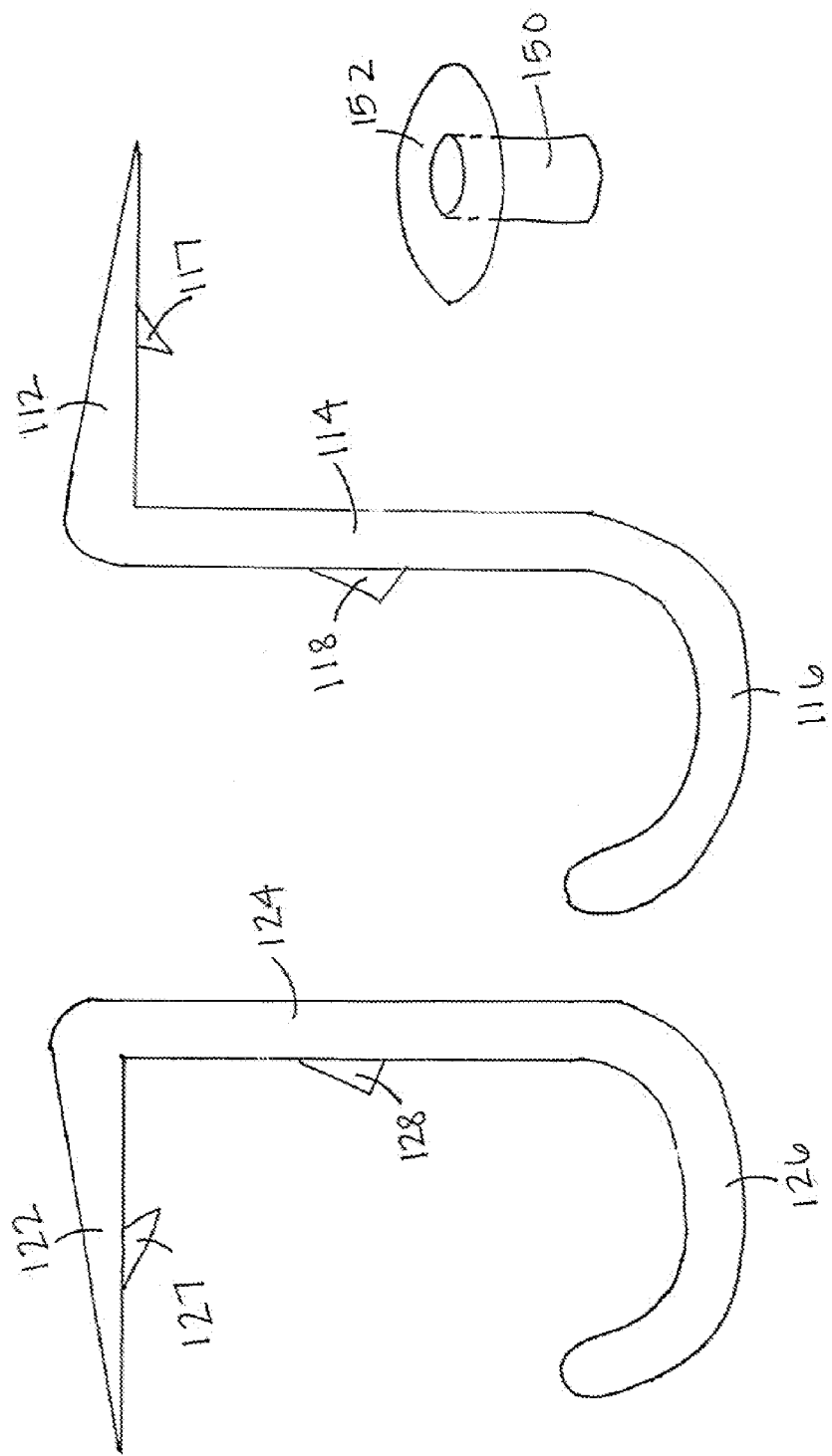
FIG. 3 is a diagram illustrating a disassembled two-pronged embodiment.

FIG. 3 is a diagram illustrating a disassembled two-pronged embodiment. As previously discussed, though the first and second members 110, 120 both have three sections, the orientation between the prong sections 112, 122 and the corresponding hook sections 116, 126 may differ between the first member 110 and the second member 120. Moreover, as previously mentioned, the prong sections 112, 122 may have a protrusion or notch 117, 127. Additionally, in some embodiments, the yoking collar 150 may also include a skirt 152. In certain embodiment, the skirt 152 may be a different material than that of the yoking collar 150. In other embodiments, the skirt 152 may be the same material as that of the yoking collar, but a different density thereof.

Figure 4:
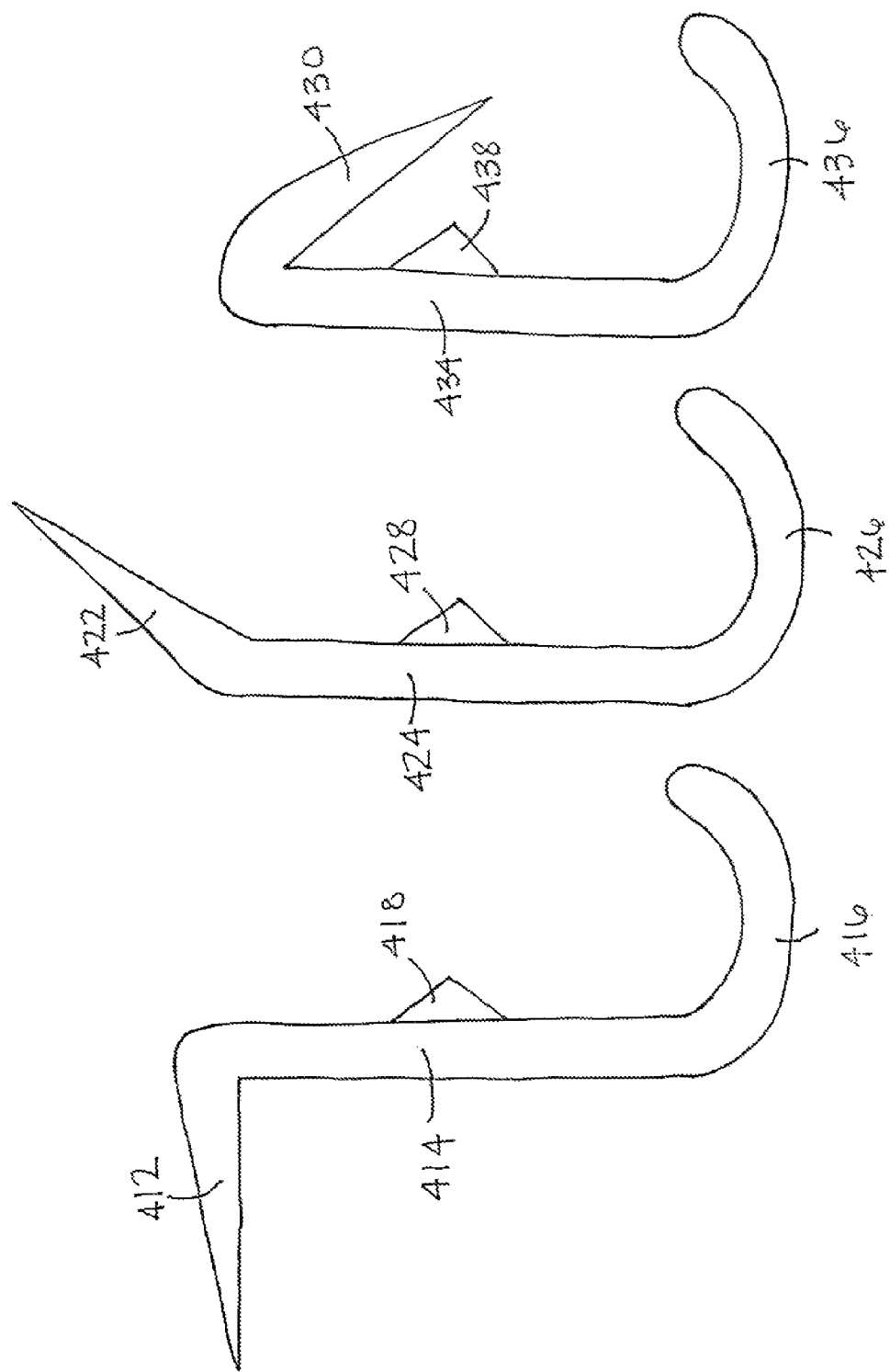
FIG. 4 is an isometric diagram illustrating a disassembled three-pronged embodiment.

FIG. 4 is an isometric diagram illustrating a disassembled exemplary three-pronged embodiment. As with the two-pronged embodiment, each member 410, 420, 430 of the three-pronged embodiment have three sections: prong sections 412, 422, 432 at one end, hook sections 416, 426, 436 at the opposite extreme, and shaft sections 414, 424, 434 joining the hook sections 416, 426, 436 to the prong sections 412, 422, 432. As previously described, the shaft sections 414, 424, 434 and the prong sections 412, 422, 432 may include protrusions or notches 418, 428, 438.

As with FIG. 1, though each of the members 410, 420, 430 have three sections, the orientation between the prong sections 412, 422, 432 and the corresponding hook sections 416, 426, 436 may differ between the first member 410, the second member 420, and the third member 430. For example, when in the deployed configuration, the prong section 412 of the first member 410 may be offset 60° to the left of the hook section 416, while the prong section 422 of the second member 420 may face the opposite direction (offset 180°) of the hook section 426, and the prong section 432 of the third member 430 may be offset 60° to the right of the hook section 436, when looking down.

Figure 5:
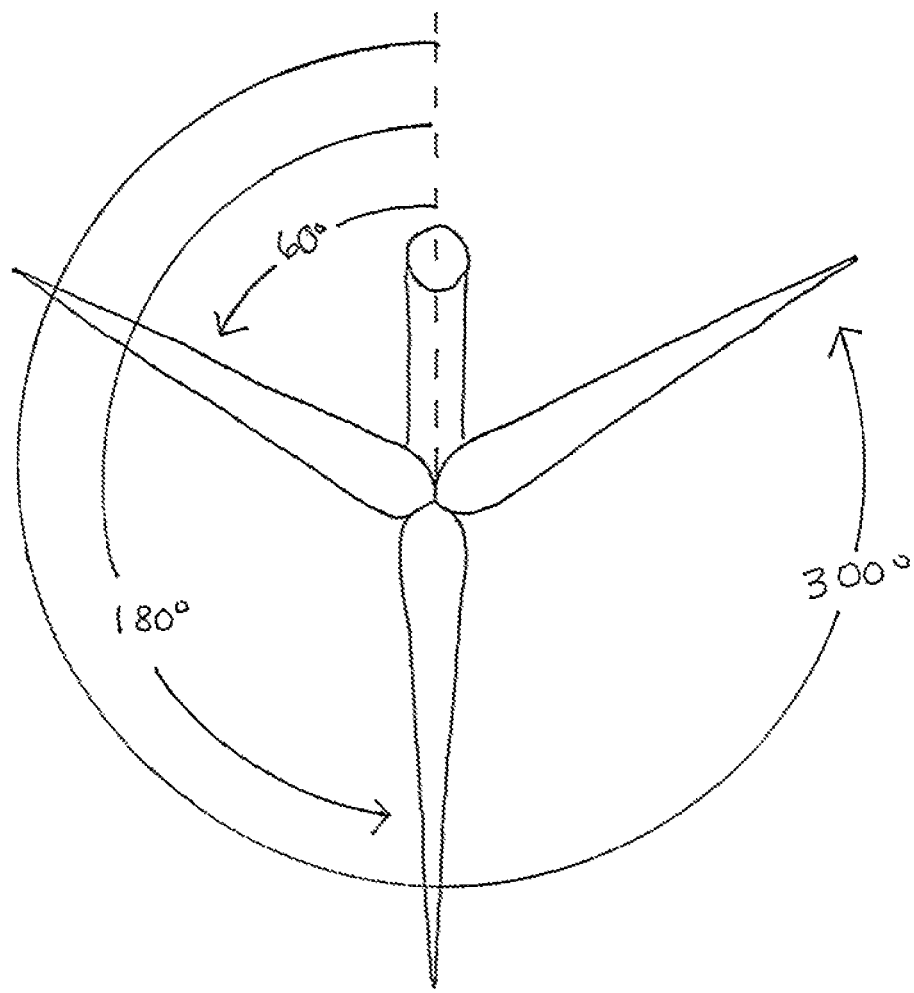
FIG. 5 is a diagram illustrating a top view of an exemplary three-pronged embodiment of the present disclosure in a deployed configuration.

FIG. 5 is a diagram illustrating a top view of an exemplary three-pronged embodiment in a deployed configuration. Where the hook sections 416, 426, 436 are oriented towards 0°, the prong section 412 of the first member 410 is oriented towards 60°, the prong section 422 of the second member 420 is oriented towards 180°, and the prong section 432 of the third member 430 is oriented towards 300°. Moreover, the substantially parallel shaft sections 414, 424, 434 of the members 410, 420, 430 may be perpendicular to the corresponding prong sections 412, 422, 432 and therefor go into the page.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A ceiling mountable hanging apparatus configurable into a first configuration and a second configuration, comprising:
   a first rigid member comprising a shaft section joining a proximal end of a substantially perpendicular prong section with a proximal end of a hook section;
   a second rigid member comprising a shaft section joining a proximal end of a substantially perpendicular prong section with a proximal end of a hook section;
   a yoking collar rotationally coupling the rigid members in a substantially parallel manner along the longitudinal axis of the shaft section of the rigid members;
   the prong sections of the rigid members are substantially coplanar and comprising a notch or protrusion;
   the distal end of said prong sections are tapered to a point;
   wherein the first configuration is a deployment configuration wherein the orientation of the prong sections of the rigid members are offset by at least 120° and the orientation of the hook sections of the rigid members are substantially parallel so as to form a single hook and;
   wherein the second configuration is a mounting configuration configured for easy penetration of the prong sections into a ceiling or wall wherein the orientation of the prong sections of the rigid members are substantially parallel.

2. The ceiling mountable hanging apparatus of claim 1, further comprising: a third rigid member comprising a shaft section joining a proximal end of a substantially perpendicular prong section with a proximal end of a hook section, wherein the yoking collar couples the shaft section of the third rigid member substantially parallel to the shaft sections of the first rigid member and the second rigid member.

* * * * *